United States Patent
Lin et al.

(10) Patent No.: US 9,225,764 B2
(45) Date of Patent: Dec. 29, 2015

(54) APPLICATION COMPOSITOR FOR CONVERGED SIP AND HTTP SERVLET APPLICATIONS BACKGROUND

(71) Applicant: Avaya Inc., Basking Ridge, NJ (US)

(72) Inventors: Ping Lin, Belleville (CA); Lin Lin, Belleville (CA); Gordon Brunson, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 379 days.

(21) Appl. No.: 13/630,249

(22) Filed: Sep. 28, 2012

(65) Prior Publication Data
US 2014/0095581 A1 Apr. 3, 2014

(51) Int. Cl.
*G06F 15/16* (2006.01)
*H04L 29/08* (2006.01)
*G06Q 30/02* (2012.01)
*G06F 9/48* (2006.01)
*G06Q 10/06* (2012.01)
*G06F 9/54* (2006.01)
*G06Q 10/10* (2012.01)

(52) U.S. Cl.
CPC ............ *H04L 67/02* (2013.01); *G06F 9/4843* (2013.01); *G06F 9/54* (2013.01); *G06F 9/546* (2013.01); *G06Q 30/02* (2013.01); *G06F 9/544* (2013.01); *G06Q 10/06* (2013.01); *G06Q 10/10* (2013.01)

(58) Field of Classification Search
USPC ............ 709/203; 719/313; 705/301, 1, 810; 715/810
See application file for complete search history.

(56) References Cited

U.S. PATENT DOCUMENTS

2009/0187919 A1* 7/2009 Maes .......................... 719/313
2009/0222277 A1* 9/2009 Malek et al. ................... 705/1

OTHER PUBLICATIONS

JSR-289: http://www.jcp.org/en/jsr/detail?id=289.
IBM Websphere Application Server: http://publib.boulder.ibm.com/infocenter/ieduasst/v1r1m0/topic/com.ibm.iea.wasfpcea/wasfpcea/1.0/Administration/CEAFP_AppRouterConfig.pdf.
JBCP SIP Servlets Server: http://docs.redhat.com/docs/en-US/JBoss_Communications_Platform/1.2/html/SIP_Servlets_Server_User_Guide/sssicar-SIP_Servlets_Server-Application-Router.html.
WeSIP: OpenSER Converged Application Server http://www.wesip.com/mediawiki/index.php/Tutorial:Converged_HTTP_&_SIP_Applications.
Oracle Communications Converged Applicaton Server http://download.oracle.com/docs/cd/E13209_01/wlcp/wlss40/programming/converged.html.
Unified Composition Framework http://iptcomm.org/iptcomm2009papers/1569194343.pdf.
IETF, Network Working Group, RFC 4566, http://tools.ietf.org/html/rfc4566.
IETF, Network Working Group, RFC 3264, http://tools.ietf.org/html/rfc3264.
Rosenberg et al., "SIP: Session Initiation Protocol," Network Working Group, RFC 3261, 2002, 252 pages.

* cited by examiner

*Primary Examiner* — Kyung H Shin
(74) *Attorney, Agent, or Firm* — Sheridan Ross P.C.

(57) ABSTRACT

An application compositor enables the creation a sequence of SIP and HTTP servlets that comprises a converged multi-protocol application. Applications are constructed based on rules that declaratively specify a multi-protocol sequence of servlets and the transitions between the servlets, minimizing programmer effort. The application compositor works with a servlet container within an application server to determine the sequence of servlets to be executed by the servlet container when running the application, and is called by the servlet container to perform transitions between servlets.

20 Claims, 8 Drawing Sheets

APPLICATION COMPOSITOR FOR CONVERGED SIP AND HTTP SERVLET APPLICATIONS BACKGROUND

FIELD

Methods and systems for providing a declarative means using an application compositor to transition SIP and HTTP servlets to efficiently execute a sequence of both servlet types as needed in multi-protocol applications, based on rules that specify the transition and sequencing.

BACKGROUND

The JSR 289 Expert Group: SIP Servlet Specification version 1.1 allows session initiation protocol (SIP) signaling actions to be performed by applications, including acting as a user agent client, a user agent server, and a proxy. It supports an application composition model in which an initial SIP signaling request can be routed through a sequence of SIP servlet application components on a single visit to a SIP servlet container, based on one incoming request or outgoing response. Routing is handled by an application router component, taking the responsibility away from the servlet container. This model enables a larger application to be implemented by executing a declaratively-specified sequence of smaller SIP servlets.

In many cases, a SIP servlet may be associated with one or more corresponding pieces of hypertext transfer protocol (HTTP) application functionality, so that the application as a whole contains both SIP and HTTP servlets. For example, if call blocking, call forwarding, and voice mail are SIP servlets, each of these servlets may have a corresponding HTTP/web user interface that enables users or administrators to configure profiles and settings such as callers to block, call forwarding rules, voice mail greetings, etc. The voice mail SIP servlet may also be associated with HTTP-based application functionality that enables users to send and retrieve multimedia messages from a web page.

Currently, the application composition model in the JSR-289 specification works with SIP servlets only. Application composition functionality does not extend to HTTP servlets. As a result, implementers of multi-protocol applications have to handle the SIP and HTTP aspects separately. Typically, programmers deal with interactions between SIP and HTTP servlets by writing code on a case-by-case basis (e.g., putting HTTP code in SIP servlets, putting SIP code in HTTP servlets) in order to execute servlets in a particular order. Current solutions are highly inefficient without the ability to easily execute a sequence of multi-protocol servlets by specifying the sequence.

SUMMARY

It is with respect to the above issues and other problems that the embodiments presented herein were contemplated. The methods and systems are generally directed to utilizing an application compositor to employ rules that declaratively specify a multi-protocol sequence of servlets, including both SIP and HTTP servlets. The system may include an application server which includes an application compositor and a servlet container capable of receiving and processing requests for applications. Once a programmer provides information declaratively on which application components are needed in what order, the application compositor may handle requests within the application server to transition and execute pieces of code called servlets based on the rules that the programmer specified to deliver multi-protocol application functionality. The servlet container may query the application compositor. Based on the latter's responses, the servlet container may execute the application or applications in accordance with the transition and execution sequence indicated by the rules, so that users can access or utilize the functionality provided by the application sequence through a variety of devices.

The system may typically include an application server and a network able to communicate with one or more user communication devices, and may also include one or more folders (e.g., directories in a file system) which may contain SIP servlets and/or HTTP servlets. The application server may process input from programmers, including declarative information in the form of rules, which may come from user devices used as programming clients, as well as requests for functionality provided by the application from users which may come from user devices connected to the application server through the network. The user device may be a laptop or desktop computer, cellular telephone, or other type of device with computing and communication capability. A user interface that may be a web or telephony interface allows access to multi-protocol application sequences executing within the application server.

When a request is received by the application server to determine the next SIP or HTTP servlet to execute within an application, the application compositor makes a determination based on stored rules previously specified by the programmer. Based on these rules, the servlets may be transitioned and sequenced as SIP to HTTP, HTTP to SIP, SIP to SIP, and/or HTTP to HTTP. Data that needs to be passed from servlet to servlet during transition may be stored temporarily in a common area.

Each application may consist of one or more SIP and/or HTTP servlets. This model can include support for an application sequence consisting entirely of SIP servlets as well as an application sequence consisting entirely of HTTP servlets. Each servlet may optionally include an administrative attributes file that describes the data fields that need to be configured to use it.

The application compositor may work with a servlet container within the application server that supports SIP and HTTP servlets. The configuration interface for the application compositor may enable rules to be specified for routing through both servlet types and stored in a rule store. Routing through the SIP servlet parts of the application sequence may be implemented in the same way as the JSR-289 standard.

Routing from an HTTP servlet to another HTTP servlet may be implemented using a RequestDispatcher object. The RequestDispatcher has a forward method that may enable one HTTP servlet to do preliminary processing of a request and another servlet to generate the response, where the calling servlet may pass its request and response objects to the called servlet. The subcomponent of the application compositor that performs HTTP routing may act as a controller in the sense of the model-view-controller architectural pattern, which represents functionality that was not previously available in the JSR-289 application router.

Routing from an HTTP servlet to a SIP servlet may be implemented by creating a new SIP application session and sending a SIP message to start off the interaction in the session, or may be implemented by targeting an existing SIP application session within the same ConvergedHTTPSession (by using the getApplicationSession application programming interface call defined by JSR-289). By specifying a one-line rule that describes this HTTP→SIP transition, the application compositor can be instructed to execute multiple steps needed to invoke a SIP servlet from an HTTP servlet so that these steps no longer need to be hand-coded by the programmer. Routing from a SIP servlet to an HTTP servlet may be implemented by targeting an existing HTTP session within the same ConvergedHTTPSession, and preparing and passing a request object to the HTTP servlet so that it may process the request and output a response for the client that initiated the session or continue routing to the next servlet. If an HTTP session needs to be created, techniques like HTML5 WebSockets may be used to prompt the client to initiate a new session. By specifying a one-line rule that describes the SIP→HTTP transition, the application compositor can be instructed to execute multiple steps needed to invoke an HTTP servlet from a SIP servlet on behalf of the programmer, similar to the previous routing case.

SIP and HTTP routing can occur in parallel (independent SIP and HTTP execution paths) or in sequence (SIP processing handing off to HTTP processing or HTTP processing handing off to SIP processing). Parallel and sequential routing can also be combined to create more complex workflows.

A servlet container may call the application compositor to get the next servlet to run, and may transfer control to the servlet that is returned.

The application compositor may provide aggregation functionality for the administrative attribute files associated with the servlets. The default aggregation implementation may generate one or more simple web pages to enable the data fields associated with all of the servlets to be configured from a single point.

The default implementation of the application compositor may be replaced by the programmer if needed in order to support more complex or specialized composition functionality. The programmer may also replace the default implementation to provide a more sophisticated or polished interface for configuring the servlets.

In a first example scenario, the application compositor may enable the programmer to specify rules indicating that a call blocking SIP servlet runs first, a call forwarding SIP servlet runs next, followed by a voice mail SIP servlet. If the voice mail SIP servlet returns a result indicating that the caller would like to include a non-voice attachment in the message to be left, a multimedia messaging HTTP servlet may also run to handle the non-voice attachment. This sequence can constitute a converged SIP-HTTP application that enables callers coming in by telephone, if they are not previously indicated as blocked, to leave a voice message or be redirected to a web page to allow associated attachments such as documents and pictures to be left in addition to the voice message. Additionally, the application compositor may build a web page which enables the data fields that need to be configured for call blocking, call forwarding, voicemail, and multimedia messaging to be entered from a single point, based on the administrative attributes files associated with the corresponding servlets.

In a second example scenario, a web client for a voice mail system can use a telephone for recording messages. When a user clicks a telephone button in the web client, the voicemail system makes a call to his or her telephone extension. When the user clicks a compose button, whatever is spoken into the telephone is recorded. Pressing # on the telephone stops the recording and signals the web client to pop up an addressing dialog.

Clicking the telephone button triggers four actions. First, a user's browser sends a request to the voice mail HTTP servlet: GET http://ping.ca/vmail?cmd=phone. Second, the voice mail servlet looks up the user's extension and schedules an outcall. Third, a VoiceXML page is prepared that will play a prompt when the user answers: INVITE sip:dialog@mediasrv.ping.ca;voicexml=http://ping.ca/vmail/hello.vxml. Fourth, the Outcall is sent: INVITE sip:5343@ping.ca.

Clicking the compose button triggers five actions. First, the user's browser sends a request to the voice mail HTTP servlet: GET http://ping.ca/vmail?cmd=compose. Second, the voice mail servlet schedules a record operation and waits. Third, a VoiceXML page is run to record: INVITE sip:dialog@mediasrv.ping.ca;voicexml=http://ping.ca/vmail/record.vxml. Fourth, the user presses # to stop recording. The VoiceXML page exits, causing a SIP BYE to be sent. Fifth, the voice mail servlet is woken up by the SIP BYE and returns the addressing page to the browser.

The second scenario incorporates both SIP functionality for interacting with the end user's telephone and HTTP functionality, including media processing controlled through VoiceXML. It includes both HTTP to SIP and SIP to HTTP servlet transitions, which are specified in rules provided by the programmer to the application compositor. Operating with these rules, the application compositor enables the given SIP servlets to be sequenced with the HTTP servlets and transitioned as specified to provide the overall application functionality of recording voicemail messages from a web client through the telephone.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions/data to a processor for processing and execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. Accordingly, the disclosure is considered to include a tangible storage medium or distribution medium and prior art-recognized equivalents and successor media, in which the software implementations of the present disclosure are stored.

The term "Hypertext Transfer Protocol" (HTTP) as used herein refers to an application protocol for distributed, collaborative, hypermedia information systems. HTTP is the foundation of data communication for the World Wide Web, coordinated by the Internet Engineering Task Force (IETF) and the World Wide Web Consortium (W3C). Hypertext is a multi-linear set of objects, building a network by using logical links (the so-called hyperlinks) between the nodes (e.g. text or words). HTTP is the protocol to exchange or transfer hypertext.

The term "SIP" as used herein refers to Session Initiation Protocol. SIP is as described in RFC 3261, dated June 2002, by Rosenberg et al., available from the Internet Engineering Task Force (IETF); this document and all other documents (e.g., RFC 4566, RFC 3264, etc.) from the IETF describing SIP are herein incorporated by reference in their entirety for all that they teach. The embodiments may also use SIP or other protocols to accomplish the processes described herein.

The term "module" as used herein refers to any known or later developed hardware, software, firmware, artificial intelligence, fuzzy logic, or combination of hardware and software that is capable of performing the functionality associated with that element.

The terms "determine", "calculate" and "compute," as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "communication device" or "communication endpoint" as used herein refers to any hardware device and/or software operable to engage in a communication session. For example, a communication device can be an IP-enabled phone, a desktop or cellular phone, a personal digital assistant, a soft-client telephone program executing on a computer system, etc.

The term "communication session" as used herein refers to any communication or set of communications between communication devices, whether communication endpoints or other devices and whether including audio, video, text, or other multimedia data. Typically, a communication session includes one or more communication endpoints, user agents, and/or communication servers (e.g., a SIP server).

The phrase "in communication" shall mean any electrical connection, whether wireless or wired, that allows two or more systems, components, modules, devices, etc. to exchange data, signals, or other information using any protocol or format.

The term "application" or "server application" as used herein refers to computer software designed to help the user to perform specific tasks. Applications may be part of computer system software or may be separate software that can be added. An application can manipulate text, numbers, graphics, other data, or a combination of these elements. The application server may be owned and operated by an enterprise in which applications are accessed by end user and programming devices.

The term "folder" or "directory" as used herein refers to any virtual container within a digital file system in which groups of computer files can be kept and organized. The folder or directory can be any type of folder, directory or storage framework described in conjunction with FIGS. 7 and 8, which is located, organized, and stored on any type of non-transitory, tangible computer readable medium.

The term "network" as used herein refers to a system used by a communication platform to provide communications between endpoints. The network can consist of one or more user elements, feature servers, communication endpoints, etc. that allow communications, whether voice or data, between two users. A network can be any network or communication system as described in conjunction with FIGS. 7 and 8. Generally, a network can be a local area network (LAN), a wide area network (WAN), a wireless LAN, a wireless WAN, the Internet, or other network that receives and transmits messages or data between devices to facilitate communication activities. A network may communicate in any format or protocol known in the art, such as, transmission control protocol/internet protocol (TCP/IP), 802.11g, 802.11n, Bluetooth, or other formats or protocols.

The term "compositor" as used herein refers to a mechanism that sequences servlets automatically on the basis of a set of rules. The compositor is queried at runtime and provides a response indicating the next servlet to run.

The term "servlet" as used herein refers to a Java programming language class used to extend the capabilities of servers that host applications access via a request-response model. Thus, a servlet can be thought of as a Java Applet that runs on a server instead of a browser. An HTTP servlet is a Java-based component of a web application that runs within a servlet container, while a SIP servlet is a Java-based application component that performs SIP signaling from within a servlet container.

The phrase "declarative programming" is a programming paradigm that expresses the logic of a computation without describing its control flow. Declarative programming attempts to minimize or eliminate side effects by describing what the program should accomplish, rather than describing how to go about accomplishing it. This is in contrast with imperative programming, which requires an explicitly provided algorithm.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the embodiments. Rather, the ensuing description will provide those skilled in the art with an enabling description for implementing the embodiments. Various changes may be made in the function and arrangement of elements without departing from the spirit and scope of the embodiments as set forth in the appended claims.

Figure 1:
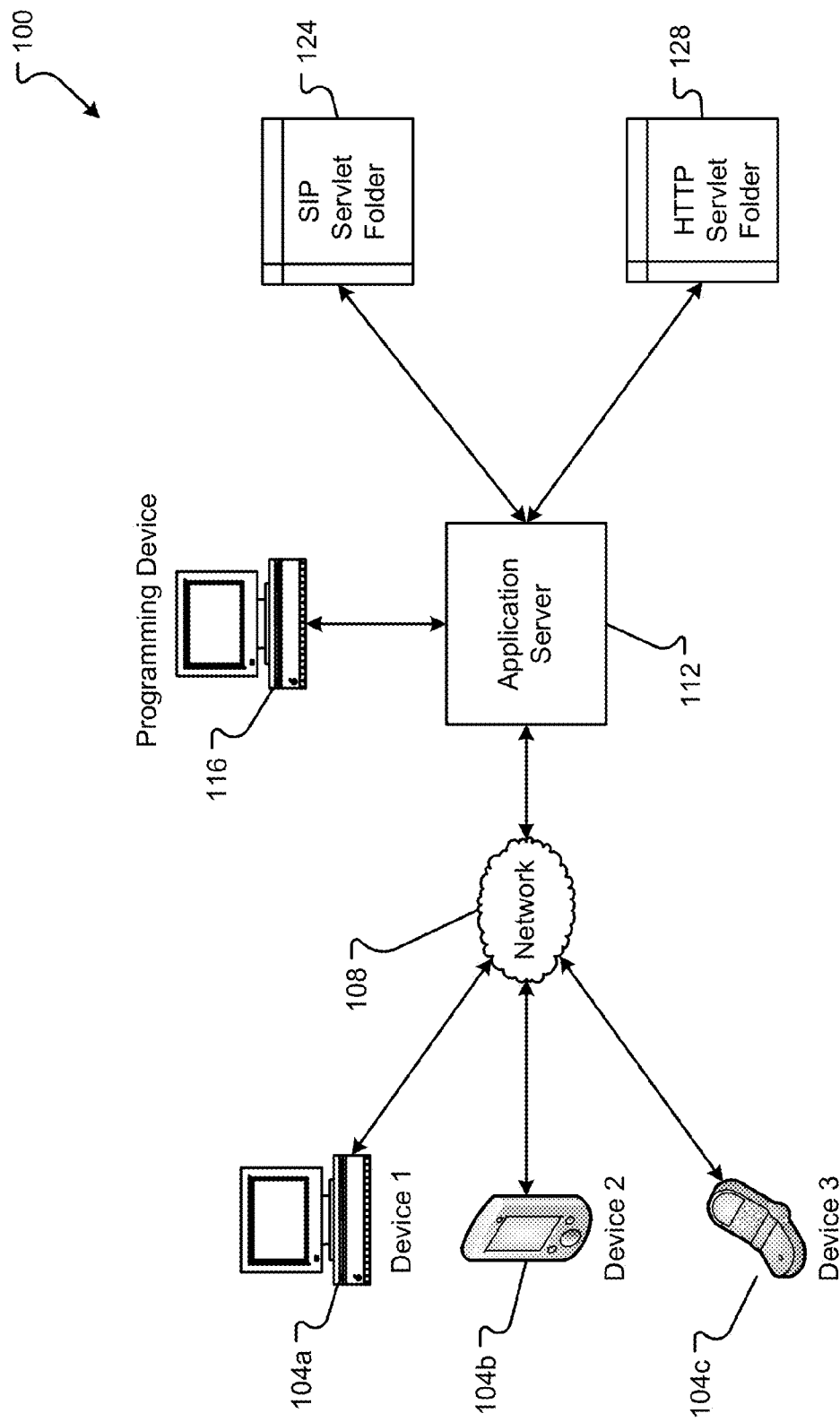
FIG. 1 is a block diagram of an embodiment of a system for creating and/or executing a server application.

FIG. 1 shows an illustrative embodiment of a communication system 100 in accordance with at least some embodiments of the present disclosure. The communication system 100 may be in one location or be one element in a distributed system and, in some embodiments, may comprise a network 108 connecting one or more communication devices 104 to an application server 112. The application server 112 may be able to communicate with a programming device 116 from which it can receive instructions and information. The application server 112 may be configured to store or retrieve data from a plurality of folders 124, 128. In embodiments, any server or communication endpoint may be a computer system as described in conjunction with FIGS. 7 and 8.

In accordance with at least some embodiments of the present disclosure, the network 108 may comprise any type of known communication medium or collection of communication media and may use any type of protocols to transport messages and/or data between endpoints for any type of communication session. The network 108 may include wired and/or wireless communication technologies. In embodiments, the network 108 provides communication capability for the application server 112 to communicate with the one or more folders 124, 128, a programming device 116, and communication devices 104a-c. The network 108 can represent one or more networks, where each network may be a different communication system using the same or different communication formats, hardware, and software. The network or networks 108 may be public or private, and any of the network or communication endpoints may be public or private.

The application server 112 may receive communication from a programming device 116 or a communication device 104. The programming device may send instructions entered by a programmer in the form of rules to specify which servlets might be required in a certain sequence to execute as an application or set of applications using servlets present in one or more folders. In embodiments, an application server 112 containing modules can obtain data from folders that organize and store servlet code. One or more folders 124, 128, may include SIP servlets 124, HTTP servlets 128, or other types of servlets or associated application data. The folders may be public or private, and may be in the same location or in separate locations.

Figure 2:
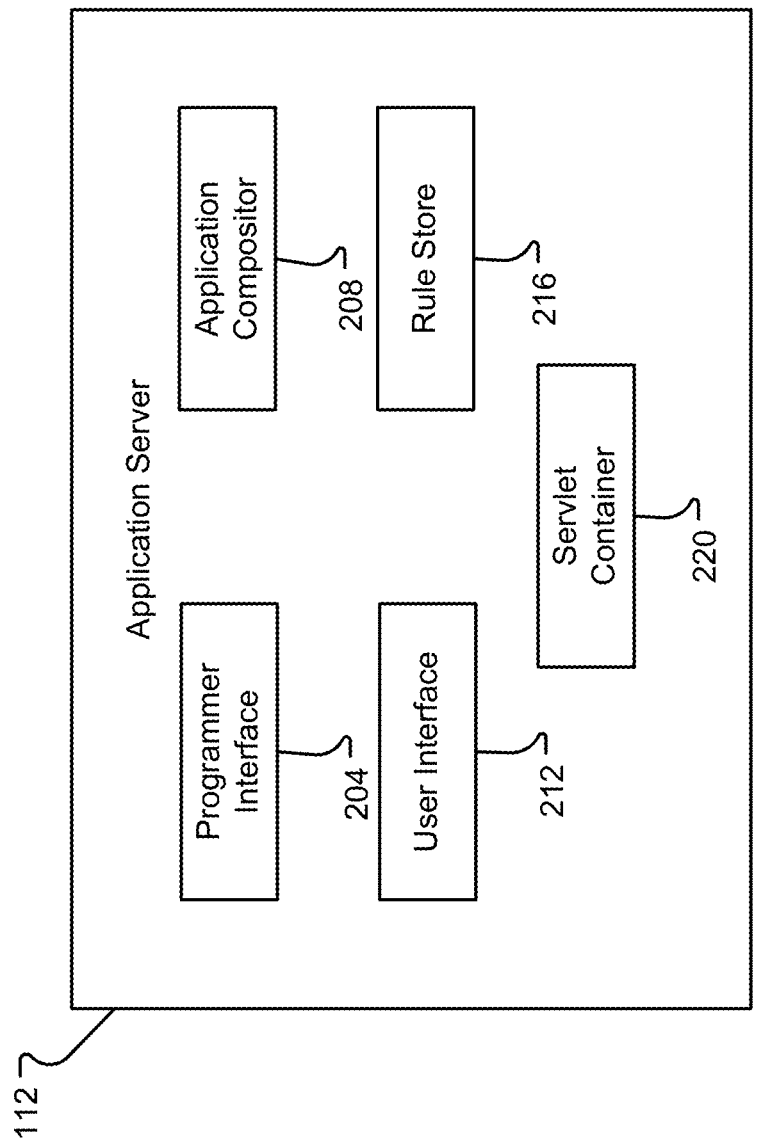
FIG. 2 is a block diagram of an embodiment of an application server.

FIG. 2 shows an illustrative embodiment of an application server 112 in which an application compositor is implemented. The application server 112 may have multiple components, or modules, including a programmer interface module 204, an application compositor module 208, a user interface module 212, a rule store module 216, and a servlet container module 220. There may be more or fewer modules than shown in FIG. 2.

The application compositor module 208 in the application server 112 may create rules which are contained in a rule store module 216 and execute transitions between servlets specified in these rules. The application server 112 may receive instructions through its programmer interface 204 to create applications and install them on the server for subsequent execution upon request through its user interface 212. The execution of applications may be carried out by the servlet container 220, which obtains servlets from SIP servlet folder 124 and HTTP servlet folder 128, and executes them in the sequence required by the given application. The application compositor 208 may be consulted by the servlet container 220 in determining the sequence in which the servlets comprising the application are executed, and may also provide mechanisms for transitioning from one servlet to the next.

A SIP application router is a typical mechanism used to select the order in which SIP servlets are run. Under the auspices of the JSR-289: SIP servlet 1.1 Specification, a SIP application can be modularized so that it is composed of more than one SIP servlet. This modular approach allows servlets to be easily combined and managed and multiple applications to be constructed from the same pool of servlets as building blocks. An application compositor may have similar responsibilities to a SIP application router but is able to work in the context of applications that combine SIP and HTTP servlets. A programmer provides rules by which the servlets are sequenced, and the rules are stored for later use by the application compositor. The application compositor may answer queries from the servlet container regarding which servlet to execute next based on the rules when there is a mix of SIP and HTTP servlets working together. The application compositor also may differ from an application router based on its ability to declaratively specify the four types of transitions between SIP and HTTP servlets to compose an application with a mixture of servlet types easily and efficiently. In the case of HTTP to HTTP servlet transitions, the subcomponent of the application compositor that performs HTTP routing may act as a controller in the sense of the model-view-controller architectural pattern, which also represents functionality that was not previously available in the JSR-289 application router.

The folder containing SIP servlets 124 may store one or more SIP servlets that may be needed for applications, which may be retrieved by the application server 112. When the application server 112 receives a communication request to run an application, it may execute rules from its rule store module that call for SIP servlets in the sequence. The SIP servlet folder 124 may provide one or more SIP servlets as requested by the rules.

The folder containing HTTP servlets 128 may store one or more HTTP servlets that may be needed for sequencing applications, which may be retrieved by the application server 112.

When the application server 112 receives a communication request to run an application, it may execute rules from its rule store module that call for HTTP servlets in a sequence. The HTTP servlet folder 124 may provide one or more HTTP servlets as requested by the rules.

The rule store module information previously provided by a programmer through a programming device 116 may act as a "map" for executing an application consisting of a sequence of servlets from folders 124, 128 without the need to store the collection of servlets in the sequence as an aggregation in another location. Additionally, the rule store module information may specify transitions between servlets in the application sequence, including SIP to HTTP, HTTP to SIP, SIP to SIP and/or HTTP to HTTP servlet transitions. The application may be accessed for use in a new or existing session by one or more communication devices 104*a-c* connected to the network 108, which may include a desktop or laptop computer 104*a*, a personal digital assistant (PDA) 104*b*, a cellular telephone 104*c*, or any of a variety of communication devices including smart phones, tablets, etc.

Thus, servlets may be identified, retrieved from folders 124, 128, executed and transitioned with direction from the rule store module 216 without the necessity of writing customized wrapper code that may differ on a per-application basis.

The application server 112 may receive a request to execute an application, as explained in conjunction with FIG. 2. A user through a user device 104 or a programmer through a programming device 116 may send the request to execute the application. The rules corresponding to the application may have been previously created from the programming device 116 and stored in the rule store module 216. The servlet container module 220 may handle the request to execute the application and works with the application compositor module 208 to complete this task. Based on the rules, the application compositor module 208 may identify one or more servlets from folders 124, 128 to be executed as part of the application sequence, and the transitions that are required to proceed from one servlet in the sequence to the next servlet. The servlet container 220 executes the servlets in the order given by the application compositor 208, and calls the application compositor to perform the transitions between each servlet and the next.

The application compositor module 208 provides a declarative capability for specifying the sequencing of SIP and HTTP servlets by invoking rules written by a programmer through programming device 116, allowing SIP servlets and HTTP servlets to be used in converged and sequenced applications with a minimal amount of programming. The application compositor module 208 may create a temporary data storage area for transitions between SIP and/or HTTP servlets if required. Once the temporary data storage area is established, the SIP and/or HTTP servlets may be transitioned by the application compositor module 208 as part of the application sequence to perform the requested functions. The user interface module 212 allows communication devices 104*a-c* and programming devices 116 to access the application via a web and/or telephony interface.

Figure 3:
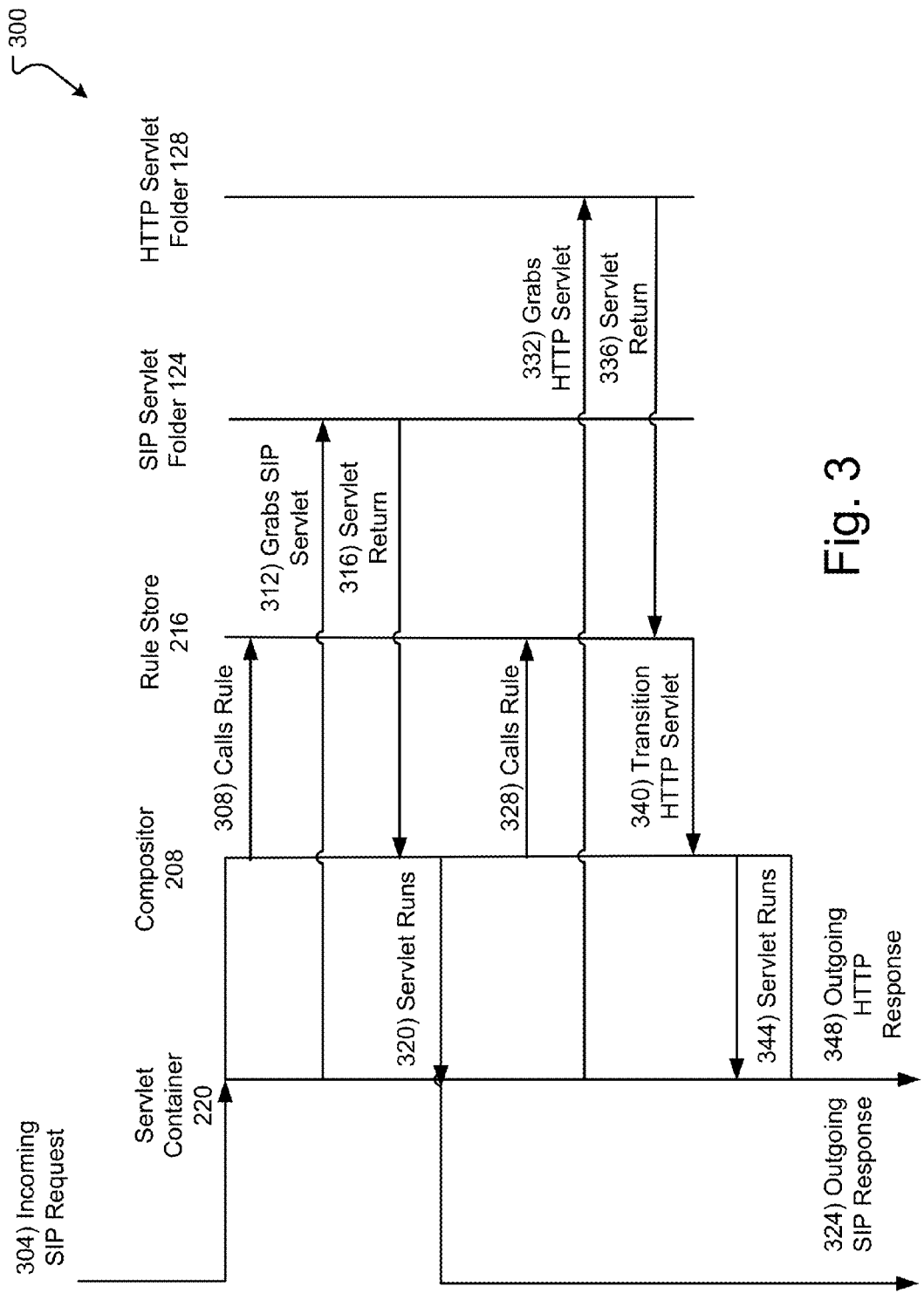
FIG. 3 is a ladder sequence diagram of an embodiment of logical relationships within a compositor.

FIG. 3 shows an illustrative embodiment of the execution of an application sequence 300 built in accordance with embodiments of the present disclosure. The sequence 300 may include an incoming SIP request 304 that is generated and sent from an end user device 104 or a programming device 116. The incoming request is handled by the servlet container 220 which queries the application compositor 208 to determine which servlet to execute next in the sequence. The application compositor 208 may retrieve a rule 308 from a rule store module 216 to determine the next action. Based on the response from the application compositor 208, the servlet container 220 may grab 312, return 316, and execute a SIP servlet 320 from folder 124 and send an outgoing SIP response 324.

The servlet container 220 may then query the application compositor 208 again for the next servlet to execute. The application compositor 208 may retrieve another rule 328 from the rule store module 216 to determine the next action. Based on the response from application compositor 208, the servlet container may grab 332 and return 336 an HTTP servlet, call the application compositor to perform a transition 340 between the previous SIP servlet and the next HTTP servlet from the folder, and then execute the HTTP servlet 344. An outgoing HTTP response 348 or a series of outgoing responses may be sent to the end user device 104 or the programming device 116 as a result of servlet execution.

Figure 4:
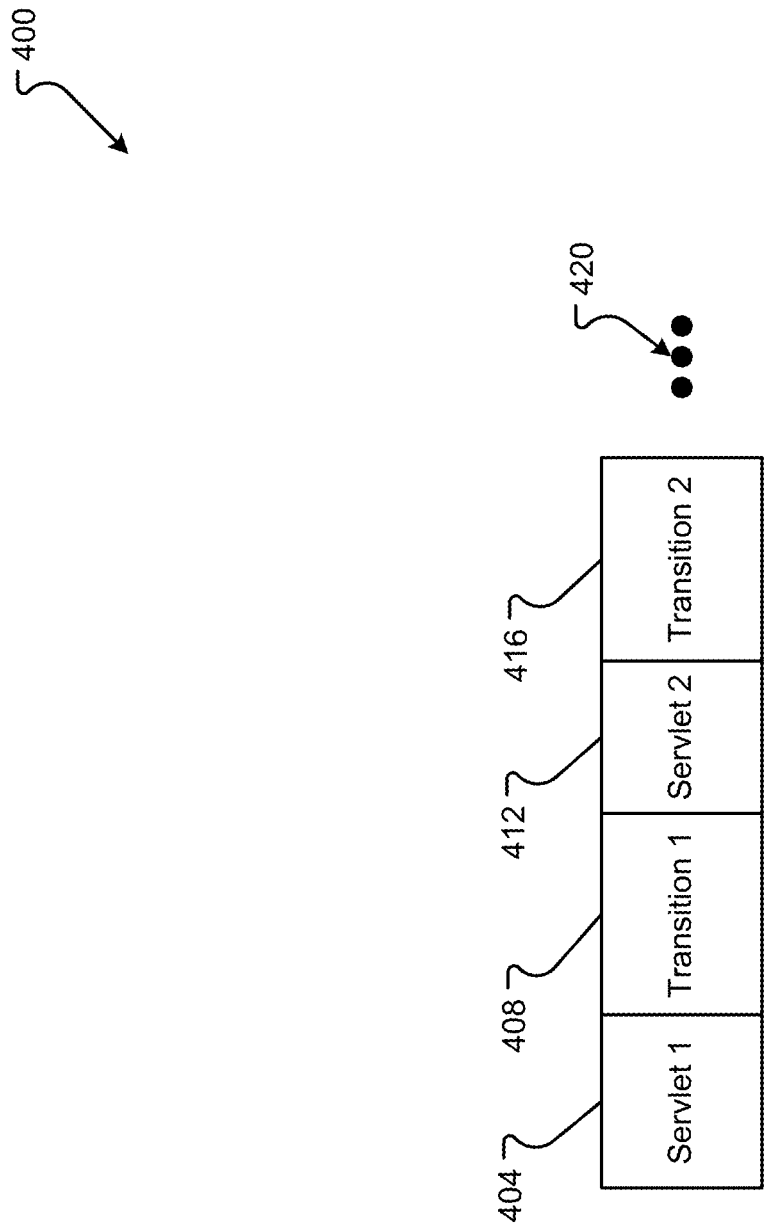
FIG. 4 is a logical block diagram of an embodiment of a server application.

FIG. 4 shows an illustrative embodiment of a sequenced converged SIP/HTTP application 400 built in accordance with embodiments of the present disclosure. The converged application 400 is specified as a set of rules stored in the rule store module 216. The rules may include identification of a number of servlets 404, 412 and a number of transition steps 408, 416. These rules enable the application compositor 208 to instruct the servlet container 220 regarding the sequence to execute, and to be called by the servlet container 220 to perform transitions needed between the servlets.

A servlet 1 field 404 may contain servlet identification information for a servlet needed for the application. A transition 1 field 408 may hold a one-line transition between the servlet 404 and the subsequent servlet specified in a servlet 2 field 412. A transition 2 field 416 may hold a one-line transition between the servlet 412 and the next servlet after it. While there are only two servlets 404, 412 and two transitions 408, 416 shown in FIG. 4, there may be more or fewer servlets and more or fewer transitions associated with the application sequence 400, illustrated by ellipses 420.

The first servlet may be an HTTP servlet and the second servlet may be a SIP servlet. To perform the transition between these two servlets, the application compositor 208 may create a new SIP application session and send a SIP message to start off the interaction in that session, or target an existing SIP session within the ConvergedHTTPSession in which the HTTP servlet was executing.

The first servlet may be a SIP servlet and the second servlet may be an HTTP servlet. To perform the transition between these two servlets, the application compositor may target an existing HTTP session within the ConvergedHTTPSession in which the SIP servlet was executing, and pass a request message to the HTTP servlet to process. If a new HTTP session needs to be created, techniques such as HTML5 WebSockets may be used to prompt the client to initiate the new session.

The first and second servlets may both be HTTP servlets. To perform the transition between these two servlets, the application compositor may create and use a RequestDispatcher object, which enables the first servlet to perform part of the request processing and the second servlet to generate the response. The request and response objects associated with the first servlet are passed on to the second servlet. Finally, if the first and second servlets are both SIP servlets, the transition between them may be handled in the same way as the JSR-289 application router.

Figure 5:
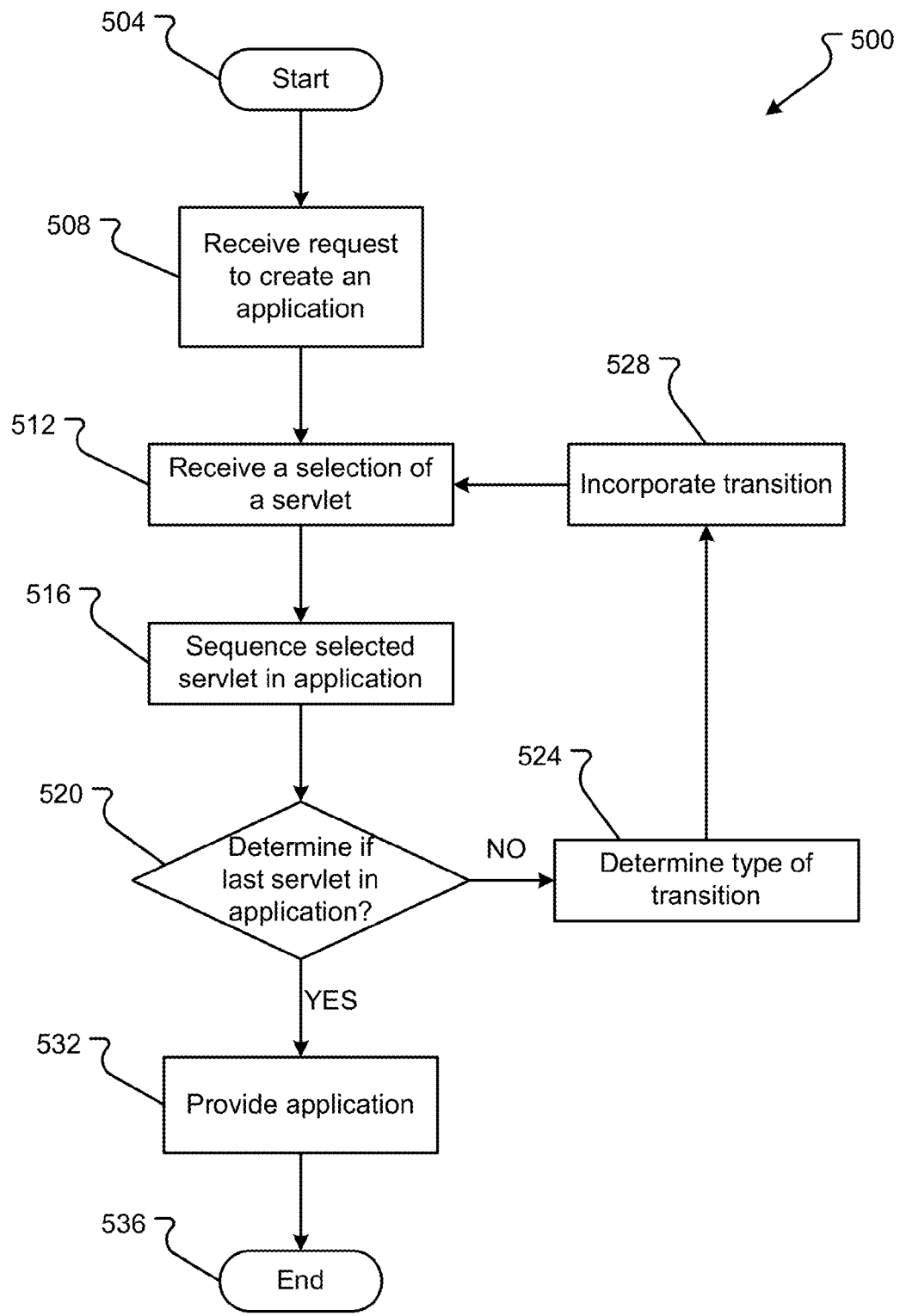
FIG. 5 is a flow diagram of an embodiment of a process for creating a server application.

A method 500 for calling a set of rules that describe the execution sequence of SIP and HTTP servlets in an application is shown in FIG. 5. Generally, the method 500 begins with a start operation 504 and ends with an end operation 536. While a general order for the steps of the method 500 are shown in FIG. 5, the method 500 can include more or fewer steps or the order of the steps can be arranged differently than those shown in FIG. 5. The method 500 can be executed as a set of computer-executable instructions executed by a computer system and encoded or stored on a non-transitory computer readable medium. Hereinafter, the method 500 shall be explained with reference to the systems, components, modules, software, data structures, etc. described in conjunction with FIGS. 1-4.

The application server 112 may receive a request to create an application, in step 508. The request may include instructions to pick a selection of at least one servlet from folders 124 and/or 128, in step 512, for use in the requested application. The servlets and transitions among them may be sequenced by the application compositor module 208, in step 516.

A query may be executed as to whether or not the last identified servlet is the last one needed for sequencing the application, in step 520. If the answer to the query is no, the application compositor module 208 determines the type of transition, in step 524. The transition can be between SIP and/or HTTP servlets. Once the type of transition needed has been determined, the transition may be created and sequenced by the application compositor module 208, in step 528. Once step 528 is completed, the application compositor module 208 may work on the next servlet selected by the programmer, in step 512. The query is again executed as to whether or not this servlet is the last one needed for the application sequence, in step 520. If the answer is yes, then the application server 112 may, in step 532, provide the completed application sequence as a set of rules and store this set into the rule store 216 for later execution upon request by the communication device 104 or programming device 116.

Figure 6:
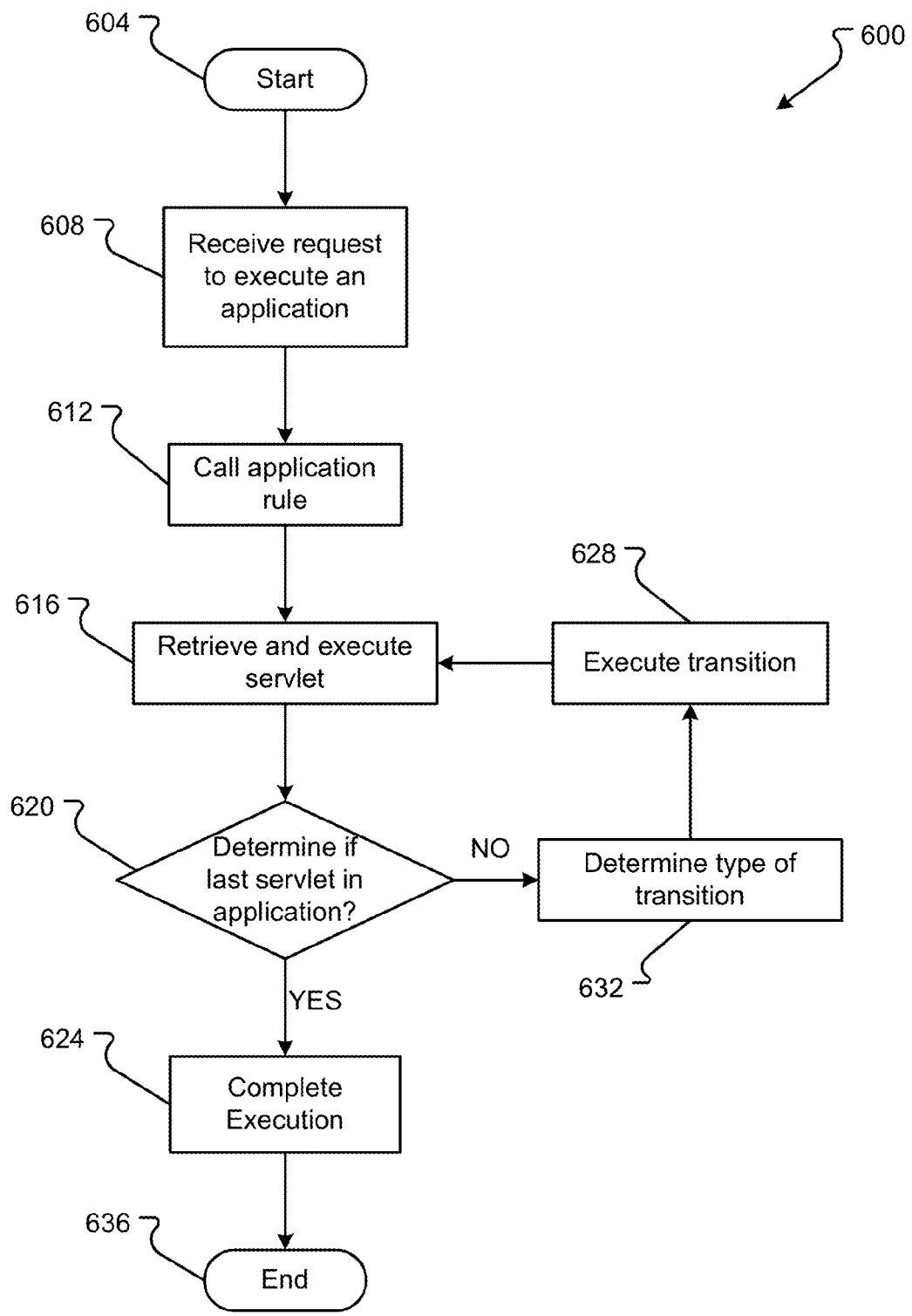
FIG. 6 is a flow diagram of an embodiment of a process for executing a server application.

A method 600 for executing a sequence of applications is shown in FIG. 6. As all the necessary servlets are retrieved, transitioned, and executed, the output is provided and is accessible by user communication devices 104a-c and/or one or more programming devices 116. Generally, the method 600 begins with a start operation 604 and ends with an end operation 636. While a general order for the steps of the method 600 are shown in FIG. 6, the method 600 can include more or fewer steps or the order of the steps can be arranged differently than those shown in FIG. 6. Hereinafter, the method 600 shall be explained with reference to the systems, components, modules, software, data structures, etc. described in conjunction with FIGS. 1-5.

The application server 112 may receive a request to execute a sequenced application, in step 608. The application server 112 may, through the interaction between its servlet container 220 and application compositor 208 components, call the first rule that is part of the application from the rule store module 216, in step 612. In step 616, the application server 112 may retrieve and execute the first servlet needed for the application sequence from a SIP Servlet folder 124 or an HTTP Servlet folder 128 based on the instructions in the rule. After the first servlet has been successfully retrieved, the application server 112 can determine based on the rule if the most recently retrieved servlet is the last servlet needed in the application sequence, in step 620. If the servlet is not the last one, the application server 112 may determine the type of transition needed based on the rule, in step 632.

The application compositor module 208 step 628 executes the transition determined in the prior step. The application server 112 may then retrieve and execute the next servlet needed for the application sequence, in step 616, per the instructions in the current rule or the next rule in the application if all of the instructions in the current rule have been used. If it is determined by the query in step 620 that the most recently retrieved servlet is the last servlet needed for the application sequence, the execution completes in step 624 after executing this last servlet and the process ends.

Figure 7:
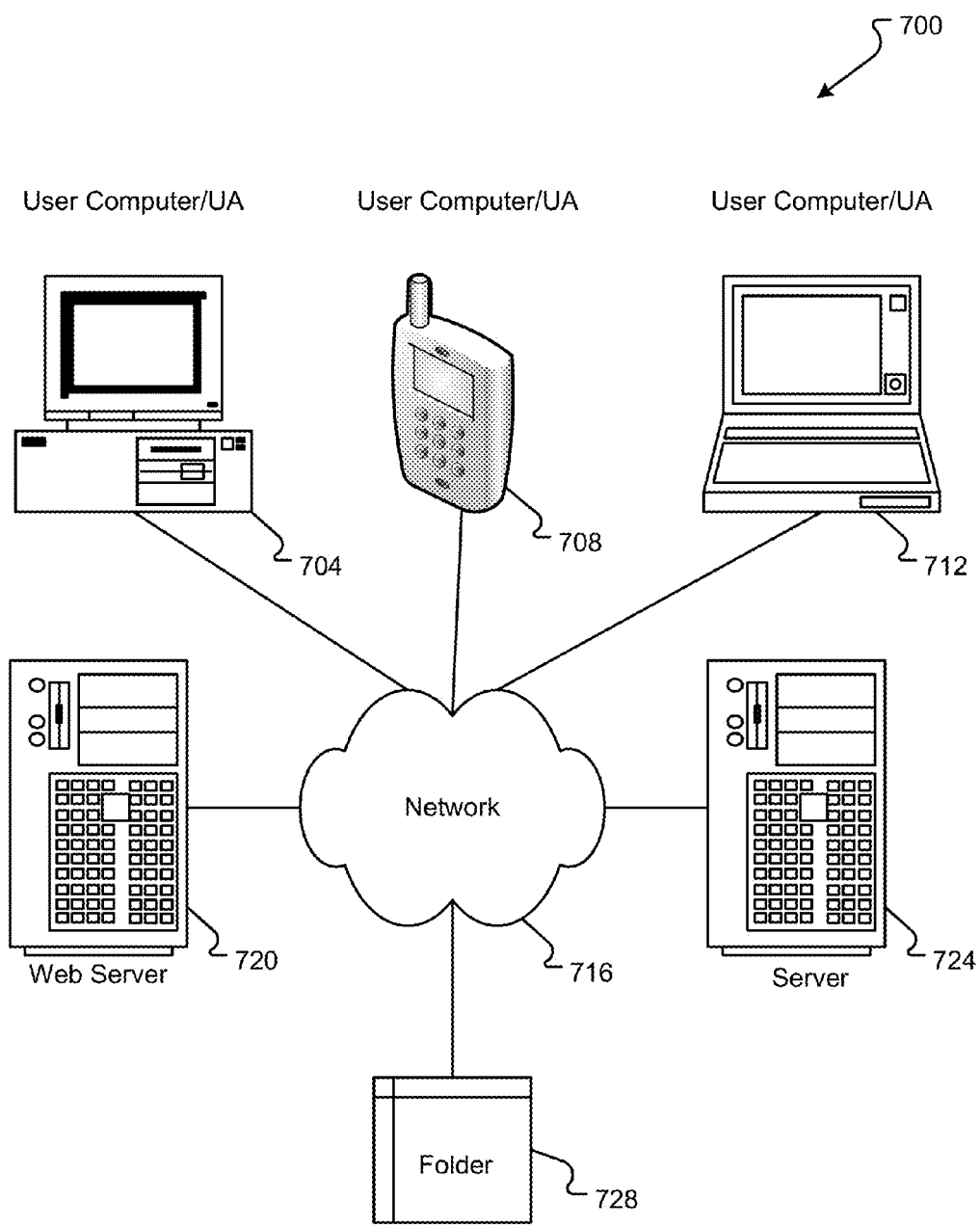
FIG. 7 is a block diagram of an embodiment of a computing environment.

The computing environment 700 shown in FIG. 7 may include one or more application servers 724, which can, in addition to an operating system, include one or more applications accessible by a client running on one or more of the user devices 704, 708, 712. The servers 720, 724 may be one or more general purpose computers capable of executing programs in response to requests from the user devices 704, 708 and 712. As one example, the server may execute one or more HTTP, SIP or converged SIP-HTTP applications. The web application may be implemented as one or more programs written in any programming language, such as SIP™, C, C#™, or C++, and/or any scripting language, such as Perl, Python, or TCL, as well as combinations of any programming/scripting languages.

The web pages created by the web application server 724 may be forwarded to a user device 704, 708 or 712 via a web server 720. Similarly, the web server 720 may be able to receive web page requests, web services invocations, and/or input data from a user device 704, 708 or 712, and can forward the web page requests and/or input data to the application server 724. In further embodiments, the server 724 may function as a file server. Although for ease of description, FIG. 7 illustrates a separate web server 720 and application/file server 724, those skilled in the art will recognize that the functions described with respect to servers 720, 724 may be performed by a single server and/or a plurality of specialized servers, depending on implementation-specific needs and parameters.

The computing environment 700 may also include a folder 728 or multiple folders. The folder 728 may reside in a variety of locations. By way of example, folder 728 may reside on a storage medium local to (and/or resident in) one or more of the computers 704, 708, 712, 720, 724. Alternatively, it may be remote from any or all of the computers 704, 708, 712, 720, 724, and in communication (e.g., via the network 716) with one or more of these. In a particular set of embodiments, the folder 728 may reside in a storage-area network ("SAN") familiar to those skilled in the art. Similarly, any necessary files for performing the functions attributed to the computers 704, 708, 712, 720, 724 may be stored locally on the respective computer and/or remotely, as appropriate.

Figure 8:
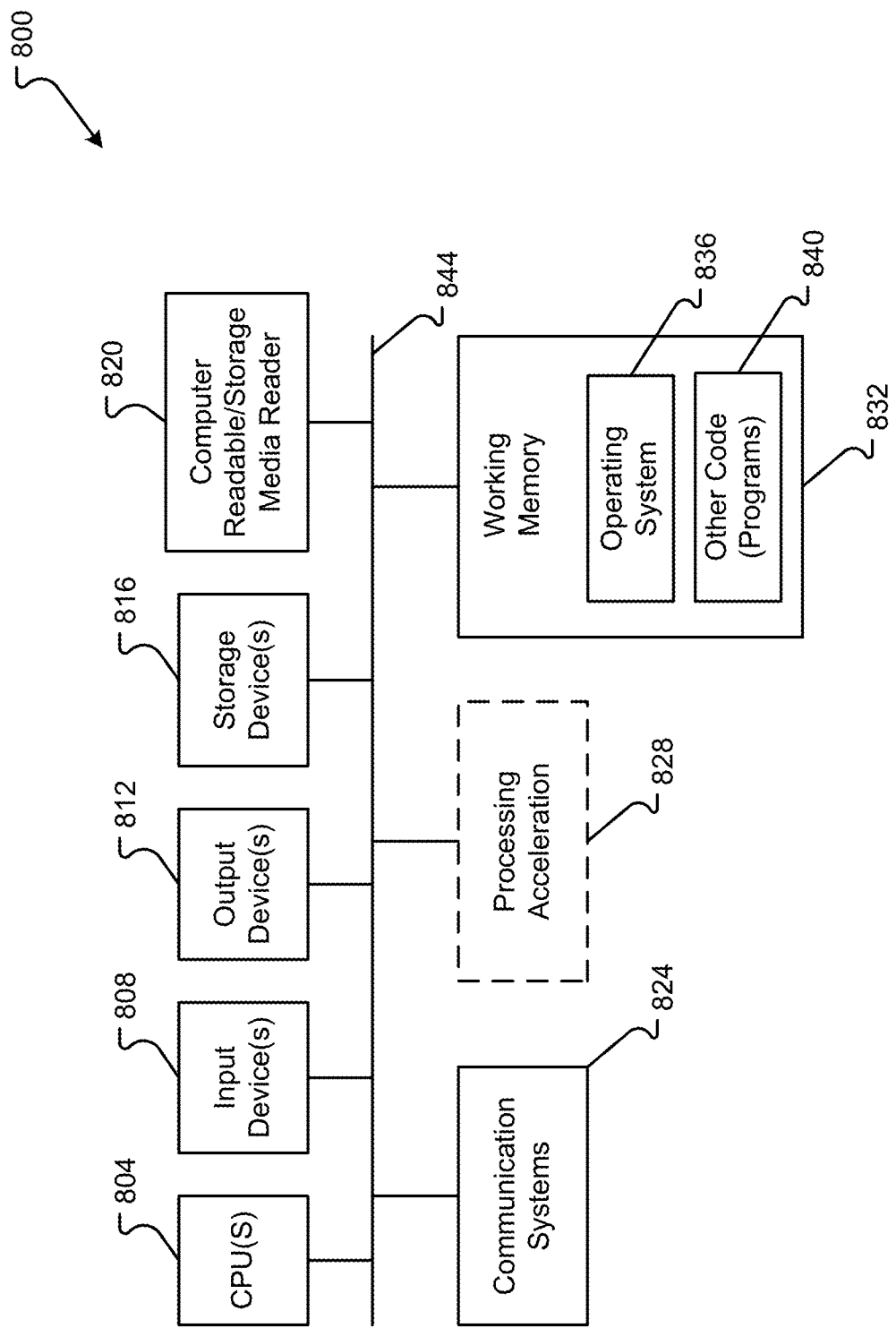
FIG. 8 is a block diagram of an embodiment of a computer.

FIG. 8 illustrates one embodiment of a computer system 800 upon which the systems, devices, servers, software modules, etc. described herein may be deployed or executed. The computer system 800 is shown comprising hardware elements that may be electrically coupled via a bus 844. The hardware elements may include one or more central processing units (CPUs) 804; one or more input devices 808 (e.g., a mouse, a keyboard, etc.); and one or more output devices 812 (e.g., a display device, a printer, etc.). The computer system 800 may also include one or more storage devices 816. By way of example, storage devices 816 may be disk drives, optical storage devices, solid-state storage devices like random access memory ("RAM") and/or a read-only memory ("ROM"), which can be programmable, flash-updateable and/or the like.

The computer system 800 may additionally include a computer-readable storage media reader 820; a communications system 824 (e.g., a modem, a network card (wireless or wired), an infra-red communication device, etc.); and working memory 832, which may include RAM and ROM devices as described above. In some embodiments, the computer system 800 may also include a processing acceleration unit 828, which can include a digital signal processor, a graphics processor, and/or the like.

The computer-readable storage media reader 820 can further be connected to a computer-readable storage medium, together (and, optionally, in combination with storage devices 816) comprehensively representing remote, local, fixed, and/or removable storage devices plus storage media for temporarily and/or more permanently containing computer-readable information. The communications system 824 may permit data to be exchanged with the network and/or any other computer described above with respect to the computer system 800.

The computer system 800 may also comprise software elements, shown as being currently located within a working memory 832, including an operating system 836 and/or other code 840. It should be appreciated that alternate embodiments of a computer system 800 may have numerous variations from that described above. For example, customized hardware might also be used and/or particular elements might be implemented in hardware, software (including portable software, such as Java applications), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figures. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments have been described in detail herein, it is to be understood that the concepts may be otherwise variously embodied and employed, and that the appended claims are intended to be construed to include such variations, except as limited by the prior art.

What is claimed is:

1. A method for executing a server application comprising:
   receiving a request to execute a server application from a requester, wherein the server application includes two or more servlets, wherein each servlet is either a SIP servlet or an HTTP servlet;
   in response to receiving the request, accessing rules associated with sequencing the server application;
   executing the first servlet;
   determining a first transition from the first servlet to a second servlet;
   executing the second servlet;
   determining if the second servlet is a last servlet in the application sequence;
   if the second servlet is not the last servlet:
      determining a second transition from the second servlet to a third servlet;
      executing the third servlet; and
   if the second servlet is the last servlet, completing execution of the server application.

2. The method of claim 1, wherein the first and second servlets are SIP servlets.

3. The method of claim 2, wherein the first transition between the first and second servlets is similar to the routing performed by a JSR-289 application router.

4. The method of claim 1, wherein the first and second servlets are HTTP servlets.

5. The method of claim 4, wherein the first transition between the first and second servlets executes a RequestDispatcher object.

6. The method of claim 1, wherein the first servlet is an HTTP servlet and the second servlet is a SIP servlet.

7. The method of claim 6, wherein the first transition between the first and second servlets comprises one of:
   a. creating a new SIP application session; and sending a SIP message to initiate activity in the new SIP application session; or
   b. targeting a SIP message to an existing SIP session within a ConvergedHTTPSession in which an HTTP servlet was executing.

8. The method of claim 1, wherein the first servlet is a SIP servlet and the second servlet is an HTTP servlet.

9. The method of claim 8, wherein the first transition between the first and second servlets comprises one of:
   a. targeting an existing HTTP session within a ConvergedHTTPSession with a servlet request; passing a request object and a response object to the HTTP servlet for the HTTP servlet to process the request; or
   b. prompting the HTTP client to create a new HTTP session.

10. The method of claim 1, wherein the method further comprises repeating:
   determining another transition between servlets;
   executing the other transition;
   retrieving a next servlet;
   executing the next servlet.

11. A system configured to execute server applications, the system comprising:
   a processor;
   an internet interface that receives a request to execute a server application from a requester;
   an application compositor module that:
      responds to a request from the servlet container module to determine a next servlet to execute;
      accesses rules associated with sequencing the server application; and
      performs transitions between servlets; and
   a servlet container module in communication with the internet interface that:
      sends a request to the application compositor module to determine the next servlet to execute;
      executes the first servlet, wherein the first servlet is one of a SIP servlet and an HTTP servlet;
      determines a first transition from the first servlet to a second servlet, wherein the second servlet is one of a SIP servlet and an HTTP servlet;
      executes the second servlet,
      determines if the second servlet is a last servlet in the application sequence; and
      if the second servlet is the last servlet, completes execution of the server application.

12. The system of claim 11, further comprising a servlet container module in communication with the application compositor, the servlet container module configured to:
   if the second servlet is not the last servlet:
      determine a second transition from the second servlet to a third servlet, wherein the third servlet is one of a SIP servlet and an HTTP servlet;
      execute the second transition;
      retrieve the third servlet; and
      execute the third servlet.

13. The system of claim 11, further comprising:
   a SIP servlet folder configured to store SIP servlets; and
   an HTTP servlet folder configured to store HTTP servlets.

14. The system of claim 11, wherein the system further comprises a programmer interface module configured to provide rules to sequence the server application.

15. The system of claim 11, wherein the application compositor module, the servlet container module, and the internet interface are separable parts of an application server.

16. A computer program product including computer executable instructions stored onto a non-transitory computer readable medium which, when executed by a processor of a computer, causes the computer to perform a method that facilitates the sequencing of a server application, the instructions comprising:
   instructions that receive a request to sequence the server application;
   instructions that receive a selection of a first servlet to include in the server application, wherein the first servlet is one of a SIP servlet and an HTTP servlet;
   instructions that sequence the first servlet into the server application;
   instructions that determine a first transition to a second servlet, wherein the second servlet is one of a SIP servlet and an HTTP servlet;
   instructions that sequence the first transition into the server application;
   instructions that sequence the second servlet into the server application; and
   instructions that store the application sequence as rules in a rule store;
   instructions that determine if the second servlet is a last servlet in the application sequence; and
   if the second servlet is the last servlet, instructions configured to complete execution of the server application.

17. The computer program product of claim 16, wherein the first and second servlets are SIP servlets, and wherein instructions that sequence the first transition into the server application emulate a JSR-289 application router.

18. The computer program product of claim 16, wherein the first and second servlets are HTTP servlets, and instructions that sequence the first transition into the server application execute a RequestDispatcher object.

19. The computer program product of claim 16, wherein the first servlet is an HTTP servlet and the second servlet is a SIP servlet, and wherein instructions that sequence the first transition into the server application comprise one of:
   a. sending a SIP message to initiate a SIP application session; and
   b. targeting an existing SIP session within a ConvergedHTTPSession with a SIP message.

20. The computer program product of claim 16, wherein the first servlet is a SIP servlet and the second servlet is an HTTP servlet, and wherein instructions that sequence the first transition into the server application comprise one of:
   a. instructions that target an existing HTTP session within a ConvergedHTTPSession with a servlet request; and
   b. instructions that pass one of a request and a response object to the HTTP servlet to process the servlet request; and
   c. instructions that prompt the HTTP client to create a new HTTP session.

* * * * *